S. MUNSON.
SHOCK ABSORBER.
APPLICATION FILED APR. 26, 1919.
1,332,915. Patented Mar. 9, 1920.
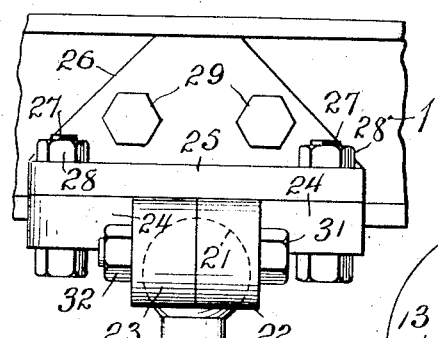
Fig 1
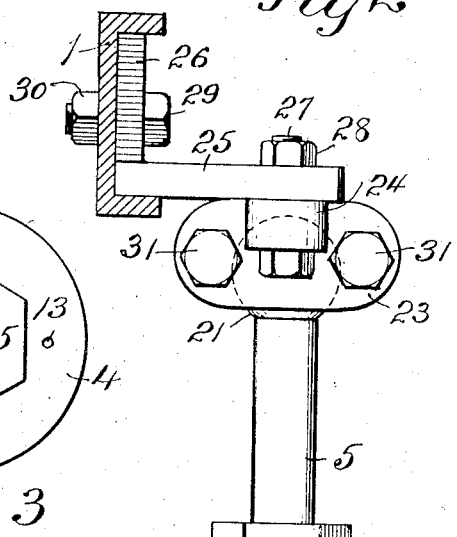
Fig 2
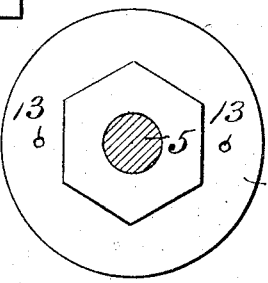
Fig 3
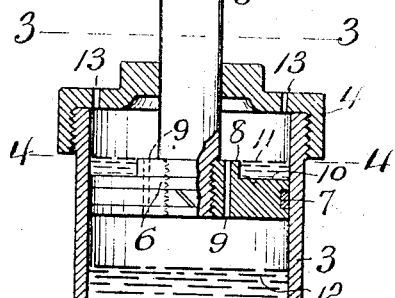
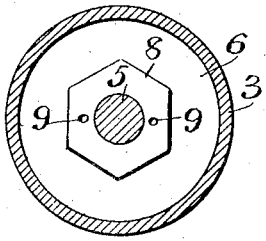
Fig 4
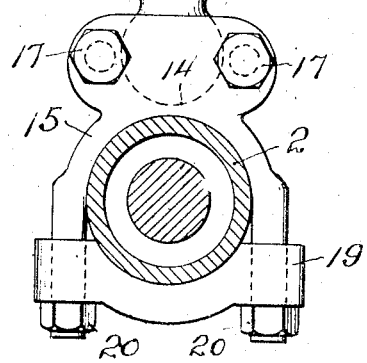
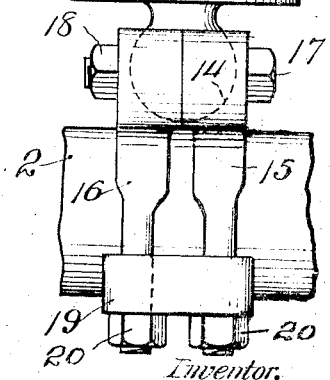
Witness:
R. C. Hamilton
Inventor,
Sweney Munson,
By Warren D. House,
His Attorney.

UNITED STATES PATENT OFFICE.

SWENEY MUNSON, OF FOWLER, COLORADO.

SHOCK-ABSORBER.

1,332,915.  Specification of Letters Patent.  Patented Mar. 9, 1920.

Application filed April 26, 1919. Serial No. 292,873.

*To all whom it may concern:*

Be it known that I, SWENEY MUNSON, a citizen of the United States, residing at Fowler, in the county of Otero and State of Colorado, have invented a certain new and useful Improvement in Shock-Absorbers, of which the following is a specification.

My invention relates to improvements in shock absorbers.

It relates particularly to a shock absorber adapted for use on the rear axle of an automobile.

The object of my invention is to provide a shock absorber which is simple in construction, strong and durable, not liable to get out of order, which may be readily applied by an unskilled person to an automobile, which is cheap to manufacture, and which will serve to snub the rebound as well as to absorb shocks due to the downward movement of the frame of the machine.

A further object of my invention is to provide a shock absorber which permits movement of the frame in any direction relatively to the axle or axle casing.

Still another object of my invention is the provision of novel self lubricating dash-pot mechanism.

Still another object of my invention is to provide a novel dash-pot which serves as a shock absorber on the downward movement of the piston and as a snubber on the upward movement of the piston, but in which there is less resistance to the upward movement than to the downward movement of the piston.

My invention provides still further a dash-pot in which the pressure is evenly distributed over the upper and lower sides of the head of the piston.

Other novel features of my invention are hereinafter fully described and claimed.

In the accompanying drawing which illustrates the preferred embodiment of my invention, Figure 1 is a view partly in side elevation and partly in vertical section of my improved shock absorber shown attached to the frame and axle casing, portions of which are shown, of an automobile.

Fig. 2 is a rear elevation of what is shown in Fig. 1, the channel bar of the frame being shown in cross section.

Fig. 3 is a cross section on the line 3—3 of Fig. 1.

Fig. 4 is a cross section on the line 4—4 of Fig. 1.

Similar reference characters designate similar parts in the different views.

1 designates a channel bar which forms part of a frame of an automobile, and 2 designates the rear axle casing. 3 designates an upright dash pot cylinder having a screw-threaded upper end, on which is fitted a cap 4 which is provided with a central hole in which is longitudinally slidably fitted a piston rod 5 having a shouldered screw-threaded lower end, on which is fitted a piston head 6, which is slidably fitted in the cylinder 3, and which may be provided with the usual peripheral packing ring 7. The head 6 is provided on its upper side with a raised portion 8, which preferably encircles the piston rod 5, and through which extend two diametrically opposite vertical holes 9, preferably located closely adjacent to the rod 5.

The upper side of the head 6 is provided with a depressed portion 10, encircling the raised portion 8 and extending to the periphery of the head. Said depressed portion 10 is adapted to contain a lubric such as oil 11, which serves to keep the periphery of the head 6, packing ring 7, and upper inner wall of the cylinder 3 well lubricated, even at such times as the machine is running on smooth roads and the head does not enter the oil 12, which is located in the cylinder below the head 6 and normally separated therefrom by an air space.

The cap 4 is provided with one or more holes 13 extending vertically therethrough. When two holes are provided, they are, preferably, disposed diametrically opposite to each other at opposite sides of the piston rod 5, preferably closely adjacent to the inner wall of the cylinder 3 and out of alinement with the holes 9 in the head 6.

The lower end of the cylinder 3 is provided with a universal joint connection with the axle casing 2, and the piston rod 5 is provided with a similar connection with the channel bar 1 of the frame. The universal joint connection which attaches the cylinder 3 to the axle casing comprises preferably a ball head 14, provided centrally at the under side of the lower end of the cylinder, two clamping yokes 15 and 16, comprising socket members, each having on its inner side a socket in which the ball head 14 is pivotally mounted. Bolts 17, each provided with a nut 18 extend through the socket members 15 and 16 and hold the latter together embracing the ball head 14, the bolts 17 being disposed at opposite sides of said ball head.

The socket members or clamping yokes 15 and 16 are bifurcated and embrace and are supported by the upper side of the axle casing 2. The downwardly extending arms of the members 15 and 16 extend through a horizontal clamping plate 19, which bears against the under side of the axle casing 2, against which it is held by means of nuts 20 mounted on the screw-threaded lower ends of the arms of the members 15 and 16.

The members 15 and 16 and the plate 19, nuts 20 and bolts 17 and nuts 18 form a rigid securing device with which the cylinder 3 is pivotally connected, preferably by a universal joint, as shown.

The upper end of the piston rod 5 is provided with a ball head, which is pivotally mounted in two sockets provided one in each of two socket members 22 and 23, each having a laterally extending lug 24, which is secured to the under side of the horizontal flange of a right-angle member 26, by a vertical bolt 27, which extends through the adjacent lug 24 and the flange 25 and is provided with a nut 28 which bears upon the top of the flange 25. The plate 26 has its vertical portion rigidly attached to the web of the channel bar 1 by horizontal bolts 29, provided with nuts 30 which bear against the opposite side of the bar 1.

The members 22 and 23 are held bolted together by means of two bolts 31, which extend through the members 22 and 23 at opposite sides of the ball head 21, and which are provided with nuts 32.

In the operation of my invention, when the frame 1 moves downwardly, air below the head 6 and the cylinder 3 resists the downward movement of the piston head, as does the oil 12, in case that the head enters the oil. As the head moves downwardly the air below the head, and it may be the oil 12, passes upwardly through the holes 9, which serve the well known purpose usual to dash-pot constructions of this character.

The upward movement of the frame 1 is snubbed by the air which is compressed in the cylinder 3 above the head 6, such air slowly escaping through the holes 13 in the cap 4. The sudden rebound of the frame 1 is thus prevented and the shock to the descending frame 1 is absorbed or eliminated.

By having the cylinder 3 and piston rod 5 pivotally connected to two rigid securing devices, attached respectively to the axle casing and the frame 1, the dash-pot mechanism absorbs all of the jars and shocks, which otherwise would be borne by the springs which support the frame. In applicant's construction, the operation is wholly independent of the springs which are usually employed to support the frame of the machine.

By having the holes 9 extending through the raised portion 8 from the top of the piston head, the passage of air through said holes does not interfere with and is not interfered with by the lubricating oil 11 carried in the depressed portion 10 of the head.

By locating the holes 9 out of alinement with the holes 13, oil spurting upwardly through the holes 9 does not pass through the holes 13, but strikes the under side of the cap 4 and serves to lubricate the piston rod 5 and also the cap 4.

By providing universal joint connections between the piston rod 5 and the cylinder 3, and frame 1 and axle casing 2 respectively, the frame is permitted to move in any direction freely without having a tendency to make the piston rod 5 or head 6 cramp or bind in the cylinder, as the piston rod 5 will always retain perfect alinement in the cylinder.

I do not limit my invention to the structure shown and described, as many modifications, within the scope of the appended claim, may be made without departing from the spirit of my invention.

What I claim is:—

In a shock absorber, the combination with a dash pot cylinder having at one end a ball, of two U shaped socket members embracing said ball and adapted to embrace the axle of a vehicle, and a clamping plate which connects the arms of both socket members and is adapted to be clamped to the axle.

In testimony whereof I have signed my name to this specification.

SWENEY MUNSON.